United States Patent
Silberberg

(10) Patent No.: US 9,865,026 B2
(45) Date of Patent: Jan. 9, 2018

(54) CAR PARKING SYSTEM

(71) Applicant: CDS WORLDWIDE PTY LTD, South Melbourne, Victoria (AU)

(72) Inventor: Michael Eli Silberberg, South Melbourne (AU)

(73) Assignee: CDS WORLDWIDE PTY LTD, South Melbourne, Victoria (AU)

( * ) Notice: Subject to any disclaimer, the term of this patent is extended or adjusted under 35 U.S.C. 154(b) by 550 days.

(21) Appl. No.: 14/525,488

(22) Filed: Oct. 28, 2014

(65) Prior Publication Data

US 2015/0120403 A1    Apr. 30, 2015

(30) Foreign Application Priority Data

Oct. 28, 2013  (AU) ................. 2013904152
Dec. 20, 2013  (AU) ................. 2013905023

(51) Int. Cl.
*G07B 15/02* (2011.01)
*G06Q 50/30* (2012.01)
*G06Q 10/00* (2012.01)

(52) U.S. Cl.
CPC ............ *G06Q 50/30* (2013.01); *G06Q 10/00* (2013.01)

(58) Field of Classification Search
CPC .... G06Q 10/00; G06Q 20/3276; G06Q 50/30; G06Q 10/087; G06Q 20/3278; G06Q 20/401; A61J 2205/60; G07B 15/02; G07B 15/04; H04W 12/06

USPC ........................... 235/384, 492, 375
See application file for complete search history.

(56) References Cited

U.S. PATENT DOCUMENTS

| | | | |
|---|---|---|---|
| 6,593,845 B1* | 7/2003 | Friedman | G06K 19/0701 340/10.1 |
| 2008/0084310 A1* | 4/2008 | Nikitin | G06K 7/0008 340/572.7 |
| 2009/0228694 A1* | 9/2009 | Karstens | G06K 1/00 713/1 |
| 2013/0018758 A1* | 1/2013 | Balasubramanian | G06Q 20/3276 705/26.41 |
| 2014/0232518 A1* | 8/2014 | Stoehr | G07B 15/04 340/5.6 |
| 2014/0281522 A1* | 9/2014 | Bortnem | H04W 12/06 713/168 |
| 2015/0120403 A1* | 4/2015 | Silberberg | G06Q 10/00 705/13 |

* cited by examiner

*Primary Examiner* — Thien M Le
(74) *Attorney, Agent, or Firm* — Michael Best & Friedrich LLP

(57) ABSTRACT

A car parking system comprises an exit control apparatus, and a host system that maintains records of a plurality of active optically readable codes (ORCs) that can be presented to the exit control apparatus of the car park for egress from the car park, wherein at least some of the active ORCs are associated with respective ones of a plurality of subscribers. The exit control apparatus is in data communication with the host system and comprises an optical code reader.

11 Claims, 4 Drawing Sheets

CAR PARKING SYSTEM

BACKGROUND OF THE INVENTION

The invention relates to a car parking system, a method of controlling a car park and a control apparatus for a car park.

Current car parking installations cater predominantly for two types of users: 1) permanent users who are users who tend to have a reserved car parking space within the car park and can access the car park at any time and 2) casual users who are using the car park on a casual basis and use unreserved car parking spaces.

Many car parks offer both casual and permanent parking. At such car parks, the entry gate usually has a card reader for reading a card assigned to a permanent user of the car park and a ticket printer for printing a ticket for a casual user. A successful read of a card of a permanent user or the printing of a ticket will cause the entry barrier to open to allow the user to enter the car park.

An intercom is also usually provided at the entrance to allow a user to speak to a car park attendant located on site in order to obtain assistance. For example, if the user's card does not read properly or the ticket machine is broken.

The card reader and ticket printer are connected to a barrier controller by hard-wired connections which make current apparatus expensive to install in the car park.

It is also necessary to provide a number of pay stations capable of accepting payment by cash and/or credit card in order to allow casual users to validate their tickets. Usually, security guards are employed in order to clear out the cash boxes of each of the pay stations on a periodic basis.

At the exit, there is also provided a card reader for reading permanent cards and a ticket reader for reading tickets to determine whether they have been validated. Upon presentation of a valid ticket or a permanent card, the exit gate is opened allowing for egress of the user's vehicle. Again, at the exit, there is need to provide an intercom for users requiring assistance. Similar wiring considerations apply at the exit as at the entrance.

With the above traditional parking systems in mind, there is a need for alternative types of parking systems.

SUMMARY OF INVENTION

In a first aspect, the invention provides a car parking system comprising:

an exit control apparatus, and a host system that maintains records of a plurality of active optically readable codes (ORCs) that can be presented to the exit control apparatus of the car park for egress from the car park, wherein at least some of the active ORCs are associated with respective ones of a plurality of subscribers, wherein:

the exit control apparatus is in data communication with the host system and comprising an optical code reader;

the exit control apparatus is configured to respond to presentation of an ORC to the optical code reader by reading the ORC, communicating with the host system to determine whether the read ORC corresponds to an active ORC, and upon the read ORC corresponding to an active ORC, controlling a barrier to permit a vehicle to exit the car park; and the host system is configured to respond to the read ORC corresponding to an active ORC associated with one of the plurality of subscribers by making the ORC inactive, associating a new active ORC with the subscriber and providing the new active ORC to the subscriber.

In an embodiment, the car parking system comprises an entry control apparatus in data communication with the host system, the entry control apparatus also comprising an optical code reader, the entry control apparatus configured to respond to presentation of an ORC to the optical code reader by reading the ORC, communicating with the host system to determine whether the read ORC corresponds to an active ORC associated with one of the subscribers, and upon the read ORC corresponding to an active ORC associated with one of the subscribers, controlling a barrier to permit a vehicle to enter the car park.

In an embodiment, the host system is configured to provide the new active ORC by communicating the new active ORC to a user's mobile device.

In an embodiment, the host system is configured to provide the new active ORC by updating a user account to include the new active ORC whereafter a user can retrieve the new active ORC with the user's mobile device.

In a second aspect, the invention provides a method of controlling a car park comprising:

reading an optically readable code presented to an optical code reader of a car park exit control apparatus;

communicating with a host system that maintains records of a plurality of active optically readable codes (ORCs) in order to determine whether the read ORC corresponds to an active ORC, at least some of the ORCs being associated with respective ones of a plurality of subscriber;

upon the read ORC corresponding to an active ORC, controlling a barrier to permit a vehicle to exit the car park; and upon the read ORC corresponding to an active ORC associated with one of the plurality of subscribers, making the ORC inactive, associating a new active ORC with the subscriber and providing the new active ORC to the subscriber.

The invention also provides computer program code which when executed implements the method. The computer program code may be provided on a tangible computer readable medium.

In a third aspect, the invention provides a control apparatus for a car park, the control apparatus comprising:

a touch operable user interface;

a touch screen display for displaying the user interface to a user and for receiving input to the user interface;

a Wi-Fi device for connecting the control apparatus via wireless communication to a wireless network;

an image capture device;

an optically readable code (ORC) module for reading ORCs presented to the image capture device;

a validation module configured to communicate with a host system storing valid ORC codes in order to determine whether each ORC presented to the image capture device is valid, the validation module configured to communicate with the host system at least partially via said wireless network; and a barrier controller for controlling a barrier to open in response to presentation of a valid ORC code.

In an embodiment, the control apparatus further comprises a voice over Internet protocol (VoIP) module accessible via the user interface to allow a user to initiate a help call.

In an embodiment, the control apparatus is configured to provide visual feedback to the user via the touch screen display to assist the user to present the ORC to the image capture device.

In a fourth aspect, the invention provides computer program code which when executed by an electronic device comprising a touch screen display, a Wi-Fi device and image capture device controls the electronic device to:

display a user interface to a user;

establish communication with a host system via a wireless network using the Wi-Fi device, the host system storing valid optically readable codes (ORCs);

read ORCs presented to the image capture device;

communicate with the host system determine whether the read ORC is valid; and control a barrier to open in response to presentation of a valid ORC code.

In an embodiment, the computer program code, when executed, enables a user to initiate a help call via the user interface of the electronic device.

In an embodiment, the computer program code, when executed, provides visual feedback via the touch screen display to assist the user to present the ORC to the image capture device.

BRIEF DESCRIPTION OF THE DRAWINGS

Embodiments of the invention will now be described in relation to the accompanying drawings in which.

DETAILED DESCRIPTION

Figure 1:
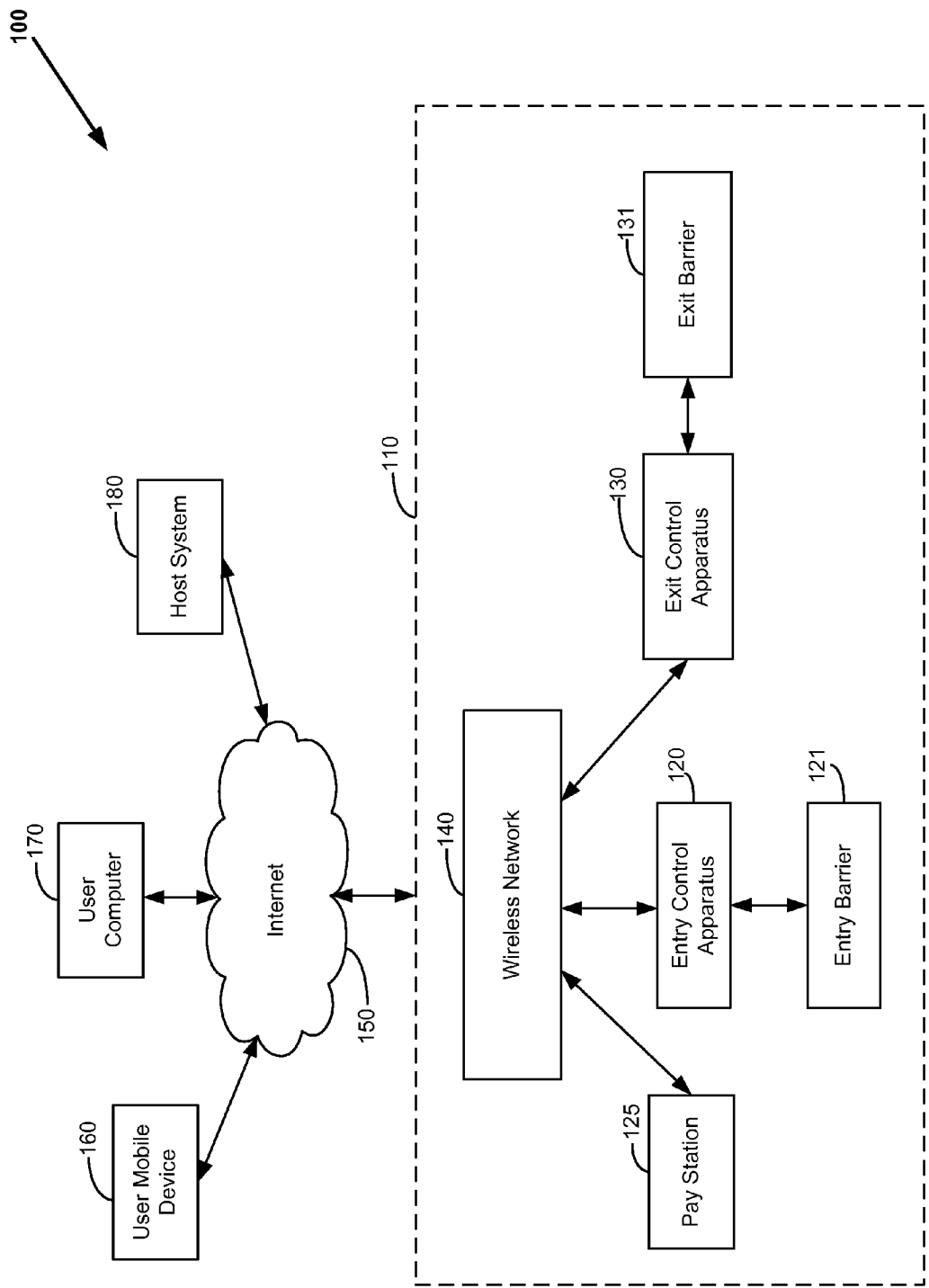
FIG. 1 is a schematic diagram of a car parking system of an embodiment of the invention.

Referring to the drawings there is shown a car parking system 100 which is configured to permit a new type of entry and exit to a car park 110. For clarity of exposition, FIG. 1 shows a single car park 110 but embodiments of the invention are intended to be used with multiple car parks so that subscribers to the system 100 can park in more than one car park using a common ticketing mechanism.

The system 100 is intended to support at least three new classes of car park users, namely, "subscribers" who wish to have the ability to park when needed at any one of a plurality of participating car parks, "multi-ticket purchasers", and "credit balance users". Subscribers establish an account within the system 100 of the embodiment which results in them being provided with, in effect, a fresh ticket for car park entry that is ready to be used whenever they wish to park in a car park. Multi-ticket purchasers purchase a fixed number of entries to car parks in advance and receive their tickets in advance in a similar manner. Credit balance users establish a cash balance (or credit) within the system and are issued new tickets while there are sufficient funds to cover a further ticket. Such users may top up their credit balance as desired. These types of users are accommodated in the system alongside the traditional permanent and casual users described above.

In the embodiments, users of the system 100 are issued with tickets in the form of electronically delivered optically readable codes (ORCs), preferably in the form of a two dimensional bar codes such as QR codes. These ORCs can be assigned a number of different statuses within a database of the host system such as: not yet assigned, active, redeemed/inactive, and active/entered car park. The host system 180 has an optically readable code database 321 which stores codes that have been deployed and their current status. The codes can be generated on the fly by an optically readable code generator (not shown) or can be periodically generated and stored in the database with the status of "not yet assigned".

In a typical use case, when a subscriber subscribes to the system 100 as will be described in further detail below, they are issued with an optically readable code, they use that optically readable code to enter a car park at which time the status of the optically readable code is changed from active to active/entered car park. The user then uses the code again to exit the car park at which time it is marked as redeemed/inactive in the database and the subscriber is issued with a new optically readable code for the next time they enter the car park.

Issuing a new optically readable code each time the user enters the car park has the advantage that the code can only be used one time which reduces the risk of fraud in the system.

In another embodiment, subscribers may be able to register their number plate with the host system 180 and license plate recognition may be employed to control an entry barrier allow the user to enter the car park. In this embodiment, an optically readable code is still used to exit the car park to guard against theft of a vehicle. In embodiments where a user's license plate is read, electronic displays may be provided in association with some or all of the parking bays and driver's may be directed (e.g. by controllable electronic signage) to park in the bay displaying their license plate number.

In FIG. 1 the car parking system 100 is illustrated schematically by showing the components deployed at a car park 110. These include an entry control apparatus 120 for controlling an entry barrier 121 which is connected via wireless network 140 and internet 150 to a host system 180 in order to be able to validate a code presented at the entry control apparatus. Similarly, exit control apparatus controls an exit barrier 131 and is also connected to the host system 180. The car park also includes one or more pay stations 125 at which casual users can pay for parking as will be described in further detail below.

A user computer 170 is used to access the host system 180 to set up an account, purchase a defined number of tickets, establish a credit balance or take advantage of other aspects of the host system 180 such as locating relevant car parking or making a car park booking as will be described in further detail below.

The user's mobile device 160 is also able to connect the host system 180 over the internet 150 and provides the primary mechanism for providing the QR code to the entry control apparatus 120 and exit control apparatus 130. That is, in an embodiment the QR code is delivered to the user's mobile device 160 and displayed on the user's device 160 to the entry control apparatus 120.

Figure 3:
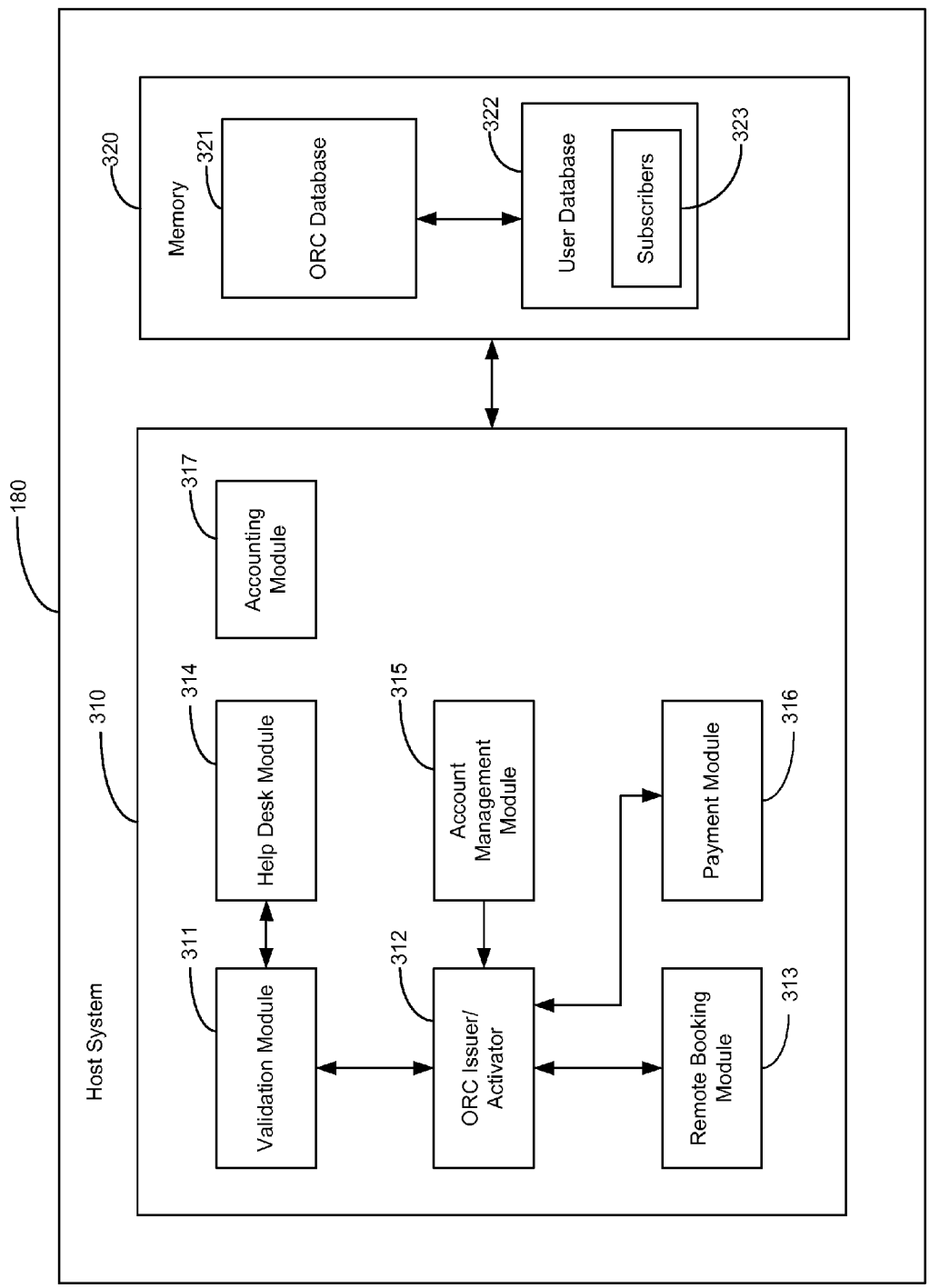
FIG. 3 is a block diagram of a host system.

Referring to FIG. 3, the host system 180 incorporates an account management module 315 which allows a user to establish a user account in accordance with known techniques. For example, by filling out a web form to provide personal details such as name, address, telephone and payment details (which may be a credit card or PayPal account, etc). Once the user is established within the host system 180, a record for that user is created in the user database 322. It will be appreciated that a subset of the users are subscribers 323 and this is an option that a user is able to select during registration by the account management module 315. As a subscriber to the system 180, the user can access all participating car parks and is provided with a fresh optically readable code each time they redeem their previous code. In this respect, it will be appreciated when the user establishes their account, they are issued with an optically readable code from database 321. FIG. 3 illustrates that the optically readable code database 321 can be associated, for example, by using a relational database structure, with the user database 322 such that an optically readable code can be assigned to a particular user. When a code is issued it has the status of "active". ORCs can be made unique by ensuring they encode different information, for example, different serial numbers.

The optically readable code can be communicated to the user's mobile device in a number of ways and this may be configured according to user preferences.

In one embodiment, an application is downloaded onto the user's mobile device. The application is configured to hold the current QR code for presentation to the entry control apparatus. The application can be configured, depending on user preferences and the capability of the user's device, to receive push notifications of new QR codes or it can be configured to pull down the current active code associated with the user in the optically readable code database 321 each time the application is launched. Further arrangements may be made for other users such as emailing newly issued QR codes to the users.

Accordingly, the user's mobile device 160 will have access to the relevant QR code. In a typical use case, the user launches the parking application as they approach a car park (for example, while approaching the barrier) and the application is configured to open up in a default display mode showing the latest active QR code.

Figure 2:
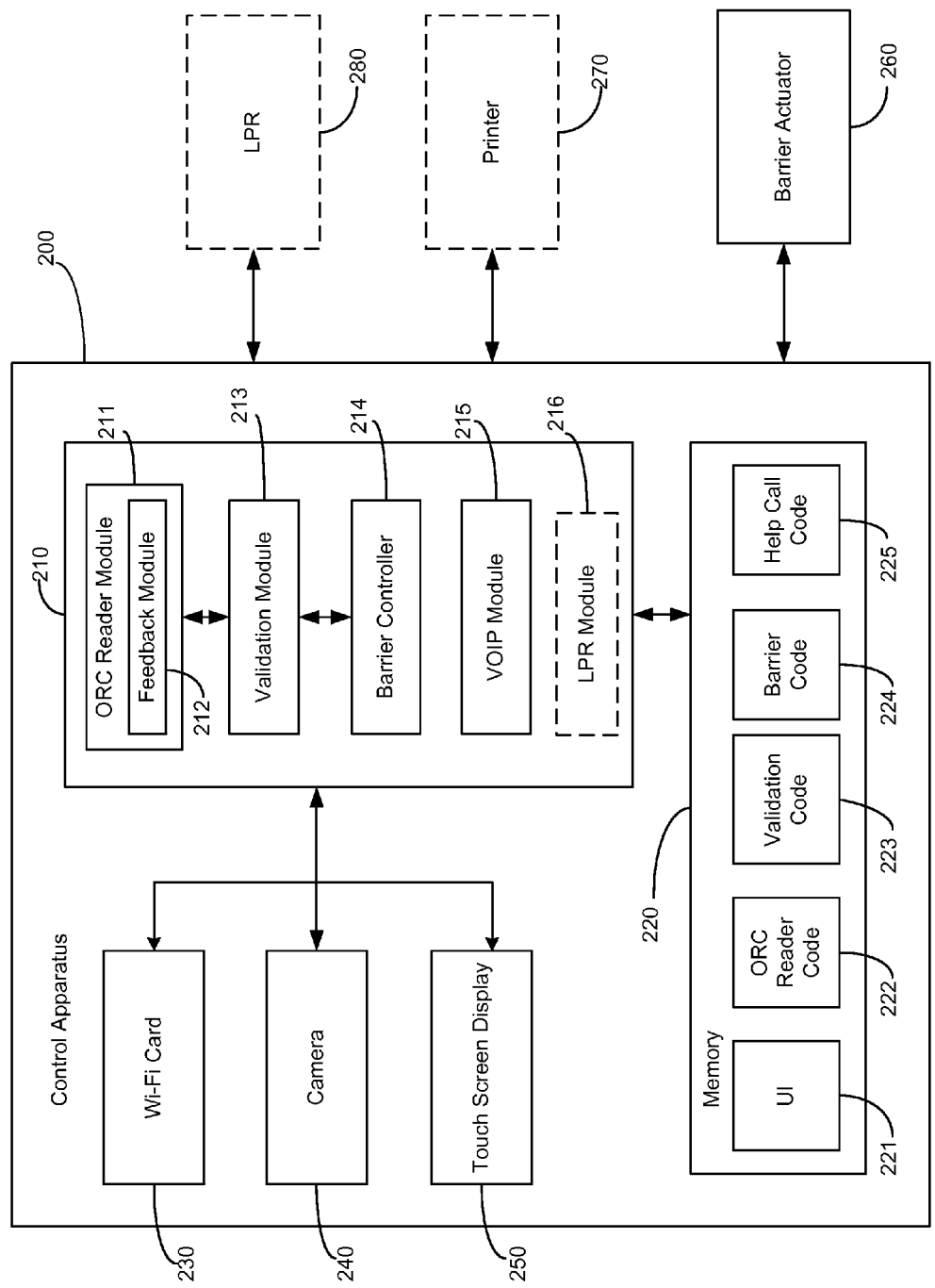
FIG. 2 is a block diagram of a control apparatus of an embodiment of the invention.

In this respect, FIG. 2 shows an exemplary control apparatus. Control apparatus 200 can be used either as an entry or exit control apparatus. As indicated, the control apparatus is connected to a barrier actuator 260 via wireless communication to reduce the cost of wiring. In one embodiment, the control apparatus can be implemented by software executed on a tablet computer device. Accordingly, it is preferred that it communicates wirelessly with connected devices in order to use inbuilt communication capabilities of the device and reduce wiring costs. Depending on where and how it is deployed, control apparatus 200 may also be connected to a printer 270 and/or a license plate reader 280.

The control apparatus 200 has a Wi-Fi card 230 for communicating wirelessly with a wireless network 140 shown in FIG. 1 in order to complete a connection via the internet 150 to host system 180. The control apparatus 200 has an image capture device in the form of a camera 240 and a touch screen display 250. A processor 220 implements a number of modules to implement the desired functionalities.

When a user in a vehicle approaches the car park, the vehicle's presence can be detected by a camera 240 under control of software executing on the processor. The user interface displayed on touch screen 250 is controlled in order to display a message for the user to present their QR code to the camera 240. An optically readable code reader module 211 controls reading of the code. In this respect, it controls the display using feedback module 212 to show the user where they are placing their code relative to the display. For example, by displaying an image of what the user is presenting to the camera and a guide (such as a cross-hair) indicative of where the user should place the code relative to the screen. In this way the user can quickly orient their mobile device relative to the camera 240.

The optically readable code reader module 211 then captures an image of the code and extracts data from the code using known code reading techniques. The optically readable code reader module 211 then passes data extracted from the code to a validation module 213. The validation module 213 communicates the data to host system 180. The host system 180 has a validation module 311 which is configured to check the optically readable code database 321 and update the status of the code to indicate that it has the status of "active and entered car park". The validation module 311 of the host system 180 then communicates that the code is valid back to the validation module 213 of the control apparatus which causes the barrier controller 214 to raise the entry barrier 121.

If there is a problem with the code, for example, it is inactive or there is difficulty in reading the code e.g. due to a damaged screen of the user's device, the processor controls the display 250 in order to instruct the user to press an area of the touch screen display to cause a ticket to print via printer 270. The printer 270 then prints a ticket for the user which may be used to obtain a valid QR code at the pay station 125 as will be described in further detail below. The user interface may also present on the touch screen display 250 an option for the user to press a further virtual button in order to activate voice over IP (VoIP) module 215 in order to place a help call. A help call is routed to the help desk module 314 of the host system which is adapted to connect the user to a relevant phone extension which is typically of VoIP telephone extension of a help desk operator. In this manner a single helpdesk module 314 can provide assistance for a plurality of car parks. It will be appreciated that information such as the identity of the car park can be displayed to the help desk operator in order to assist the help desk operator to resolve the problem.

The experience at the entry barrier is essentially the same for the multi-ticket purchaser and the credit balance user. The casual user is offered an option via the display 250 to print a ticket 270 and pay for it at the pay station as will be described in further detail below.

It will be appreciated that in order to implement the above functions, the memory 220 of the control apparatus holds relevant program code for instantiating the above modules including user interface code 221, ORC code 222, validation code 223, barrier code 224 and help call code 225.

If a user is required to print a ticket, the user goes to a pay station. The user inserts the ticket in the pay station and makes a credit card payment via payment module 316 of the host system to which the pay station is connected via the wireless network 140. The ORC issuer/activator 312 then issues a QR code to the pay station 125 which prints the QR code on a receipt that the user can present for egress from the car park. The pay station may incorporate help screens in order to allow a subscriber to resolve a problem with their account (such as a QR code that could not be read) and obtain a new QR code.

Upon exiting the car park, the user once again presents their QR code to the camera 240 of the control apparatus at the exit 130 which performs a further check with the host system using the validation module 311 that the code is active. If the code is active, the ORC database 321 is updated by the validation module 311 to change the status of the ORC to "redeemed" or "inactive". Thus, it will be appreciated that even a casual user's QR code will be redeemed at this point.

The ORC issuer/activator 312 is advised by the validation module 311 that it has updated the database 321 to reflect that an ORC has been redeemed. The ORC issuer/activator 312 checks whether the ORC code is associated with a subscriber in the database or with a multi-ticket purchaser who has not redeemed all of their prepaid tickets. If so, the ORC issuer 312 issues a new code to the user by associating an ORC code in the database with the subscriber 323.

In some embodiments, instead of using ORC codes pre-stored in the database, the ORC issuer/activator 312 generates new ORC codes in response to an ORC being redeemed.

It will be apparent that the above embodiment can be used with conventional users. As indicated above, the casual user merely prints a receipt when entering the car park. A permanent user can have ORC codes issued in the same manner described above for a subscriber but the ORC codes may be flagged as specific to a specific car park so that it can be only be redeemed when the validation module 311 receives a communication from that car park. Alternatively, the permanent users may be issued with a single ORC whose status is recorded as "permanently active" and is not redeemed at exit from the car park. Such a "permanently active" ORC may be toggled between status indicative of whether the user is in the car park or not. Additionally, the LPR module 216 may be configured to capture the user's registration upon entry and perform a cross-check against the database. Further, a permanent user (or any other registered user) may have coupons sent to their phone via the parking application upon a successful ORC validation.

It will be apparent that the embodiment can provide additional functionality. For example, the host system may include a remote booking module 313 which allows booking of a car park with the result of issue of a QR code by completing a web form over the Internet. This may result in the user being pre-allocated a specific car parking spot. In another embodiment, when the user pre-books they register their license plate, and a cross-check is performed against their license plate by the LPR module for validation. In yet another embodiment, when a user who has pre-booked arrives at the car park, the parking control apparatus 120 can display the information indicating the parking spot allocated to the user. This information can also be exchanged (e.g. via Bluetooth) with the user's device so the user does not need to remember the details. Additional information can also be provided to the user by this exchange such as coupons that can be redeemed at local shops, restaurants, etc.

In another embodiment, the remote booking module 313 can be used to browse car parks for available car parking spots before parking Accounting module 317 keeps track of which tickets have been redeemed, to render charges to subscriber accounts and establish records of amounts to be paid to owners of car parks used by users of system 100.

In another embodiment, a new ORC may be issued to a user's mobile device each time an ORC is read irrespective of whether it is for entry to the car park or exit from the car park or exit from the car park.

In some embodiments, each QR code may encode details associated with the user, such as the user's name and account number. In order to make each QR code, unique each QR code may also encode a serial number or the like.

Figure 4:
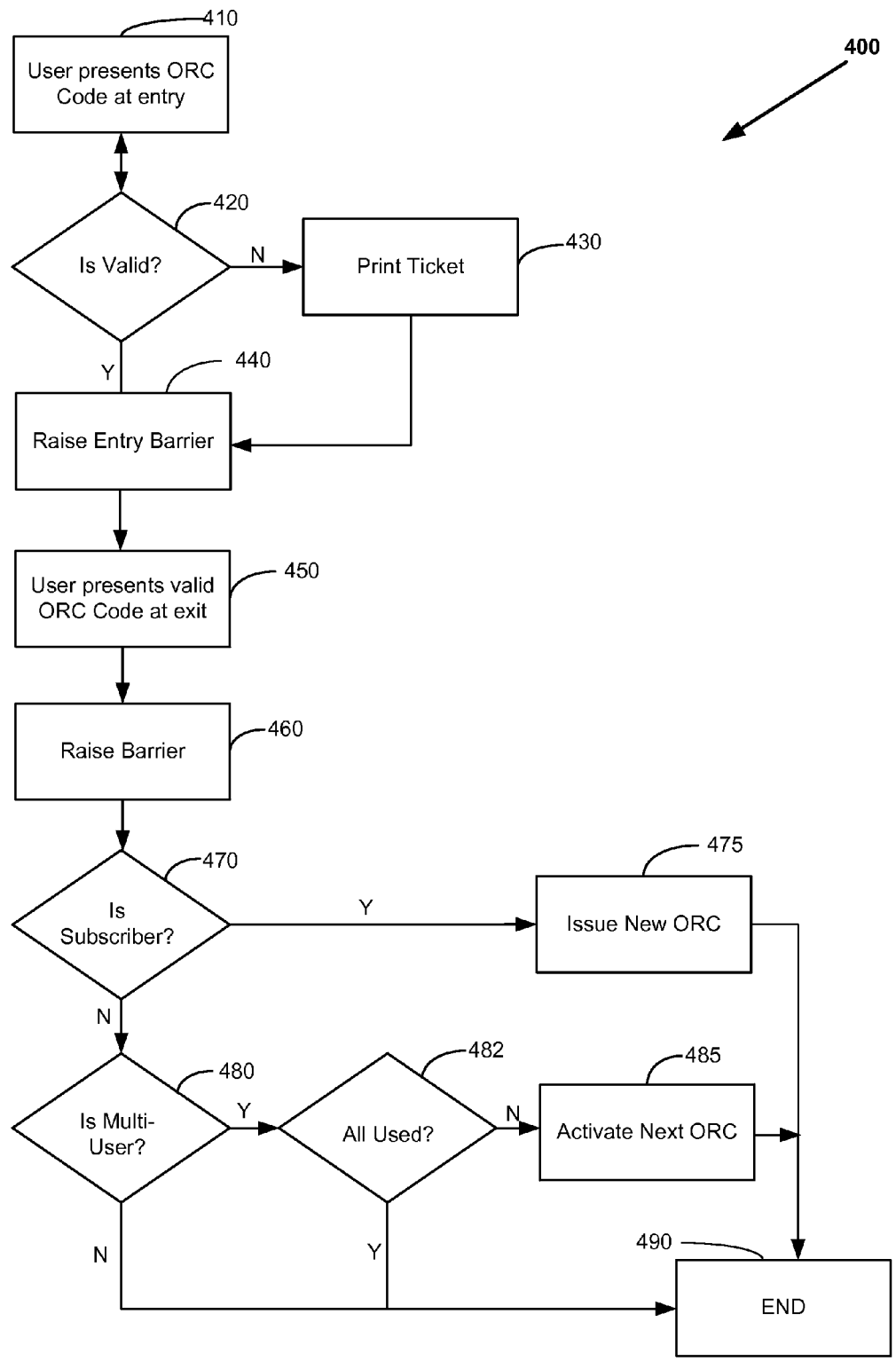
FIG. 4 is a flow chart of a method of controlling a car park of an embodiment of the invention.

A car park control method 400 of an embodiment of the invention is illustrated in FIG. 4. In the method 400, the user presents an ORC at the entrance to the car park 410. The car parking system determines whether it is valid 420 and if not prints a ticket 430 that the user must then use to obtain an ORC for exit at the pay station. The system then raises the entry barrier for valid codes or when a ticket is printed 440. The user then presents the valid ORC at the exit 450 which results in the barrier being raised 460.

The car parking system then determines (at the host system 180) whether the user is a subscriber 470. If the user is a subscriber, it issues a new ORC 475 and the car parking session ends 490. If the ORC is not associated with a subscriber, the host system determines whether the ORC is associated with a multi-user 480 and if it is, the system determines 482 whether all of the user's multiple uses have been used. If not, it activates 485 the next ORC for the user. If the user is not entitled to a further ORC, the process ends 490. A similar check can be conducted for user's who establish a credit balance.

Further aspects of the method will be apparent from the above description of the system. It will be appreciated that at least part of the method will be implemented electronically, for example, digitally by a processor executing program code. For example, in the above description certain steps are described as being carried out by the host system. It will be appreciated that these steps will be carried out by software executed by one or more processors, for example using an appropriately configured computer server. It will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

Herein the term "processor" is used to refer generically to any device that can process instructions and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor, for example, an application specific integrated circuit (ASIC) or a field programmable gate array (FPGA).

It will be understood to persons skilled in the art of the invention that many modifications may be made without departing from the spirit and scope of the invention; in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:
1. A car parking system comprising:
an exit control apparatus, and a host system that maintains records of a plurality of active optically readable codes (ORCs) that can be presented to the exit control apparatus of the car park for egress from the car park, wherein at least some of the active ORCs are associated with respective ones of a plurality of users, wherein:

the exit control apparatus is in data communication with the host system and comprises an optical code reader;

the exit control apparatus is configured to respond to presentation of an ORC to the optical code reader by reading the ORC, communicating with the host system to determine whether the read ORC corresponds to an active ORC, and upon the read ORC corresponding to an active ORC, controlling a barrier to permit a vehicle to exit the car park; and the host system is configured to respond to the read ORC corresponding to an active ORC associated with one of the plurality of users by making the ORC inactive, determining whether the respective user is entitled to a new active ORC, and upon determining that the respective user is entitled to the new active ORC, associating the new active ORC with the user and providing the new active ORC to the user.

2. A car parking system as claimed in claim 1, comprising an entry control apparatus in data communication with the host system, the entry control apparatus also comprising an optical code reader, the entry control apparatus configured to respond to presentation of an ORC to the optical code reader by reading the ORC, communicating with the host system to determine whether the read ORC corresponds to an active ORC associated with one of the users, and upon the read ORC corresponding to an active ORC associated with one of the user, controlling a barrier to permit a vehicle to enter the car park.

3. A car parking system as claimed in claim 1, wherein the host system is configured to provide the new active ORC by communicating the new active ORC to the respective user's mobile device.

4. A car parking system as claimed in claim 1, wherein the host system is configured to provide the new active ORC by updating a user account of the respective user to include the new active ORC whereafter the user can retrieve the new active ORC with the user's mobile device.

5. A method of controlling a car park comprising:
reading an optically readable code presented to an optical code reader of a car park exit control apparatus;
communicating with a host system that maintains records of a plurality of active optically readable codes (ORCs) in order to determine whether the read ORC corresponds to an active ORC, at least some of the ORCs being associated with respective ones of a plurality of users;

upon the read ORC corresponding to an active ORC, controlling a barrier to permit a vehicle to exit the car park;

upon the read ORC corresponding to an active ORC associated with one of the plurality of users, making the ORC inactive and determining at the host system whether the respective user is entitled to a new active ORC; and upon determining that the respective user is entitled to the new active ORC, associating the new active ORC with the user and providing the new active ORC to the user.

6. A method as claimed in claim 5, comprising providing the new active ORC by communicating the new active ORC to the respective user's mobile device.

7. A method as claimed in claim 5, comprising providing the new active ORC by updating a user account of the respective user to include the new active ORC whereafter a user can retrieve the new active ORC with the user's mobile device.

8. A tangible computer readable medium comprising computer program code which when executed implements the method of claim 5.

9. A control apparatus for a car park, the control apparatus comprising:
a touch operable user interface;
a touch screen display for displaying the user interface to a user and for receiving input to the user interface;
a Wi-Fi device for connecting the control apparatus via wireless communication to a wireless network;
an image capture device;
an optically readable code (ORC) module for reading ORCs presented to the image capture device;
a validation module configured to communicate with a host system storing valid ORC codes in order to determine whether each ORC presented to the image capture device is valid, the validation module configured to communicate with the host system at least partially via said wireless network; and
a barrier controller for controlling a barrier to open in response to presentation of a valid ORC code.

10. A control apparatus as claimed in claim 9, further comprising a voice over Internet protocol (VOIP) module accessible via the user interface to allow a user to initiate a help call.

11. A control apparatus as claimed in claim 10, configured to provide visual feedback to the user via the touch screen display to assist the user to present the ORC to the image capture device.

* * * * *